US006957067B1

(12) United States Patent
Iyer et al.

(10) Patent No.: US 6,957,067 B1
(45) Date of Patent: Oct. 18, 2005

(54) SYSTEM AND METHOD FOR MONITORING AND ENFORCING POLICY WITHIN A WIRELESS NETWORK

(75) Inventors: Pradeep J. Iyer, San Jose, CA (US); Partha Narasimhan, Santa Clara, CA (US)

(73) Assignee: Aruba Networks, Sunnyvale, CA (US)

( * ) Notice: Subject to any disclaimer, the term of this patent is extended or adjusted under 35 U.S.C. 154(b) by 381 days.

(21) Appl. No.: 10/254,125

(22) Filed: Sep. 24, 2002

(51) Int. Cl.[7] ............................................... H04Q 7/20
(52) U.S. Cl. ........................... 455/435.1; 455/426.1; 455/432.1; 455/435.2; 709/225; 370/338
(58) Field of Search ...................... 455/422.1, 426.1, 455/435.1; 707/1; 709/223, 225; 370/338; 435/432.1, 435.2

(56) References Cited

U.S. PATENT DOCUMENTS

| | | | |
|---|---|---|---|
| 6,493,698 B1 * | 12/2002 | Beylin | 707/1 |
| 2002/0069278 A1 * | 6/2002 | Forslow | 709/225 |
| 2002/0099503 A1 * | 7/2002 | Mishra et al. | 701/213 |
| 2002/0159418 A1 * | 10/2002 | Rudnick et al. | 370/338 |
| 2003/0017826 A1 * | 1/2003 | Fishman et al. | 455/426 |
| 2003/0018760 A1 * | 1/2003 | Putzolu et al. | 709/223 |
| 2003/0023711 A1 * | 1/2003 | Parmar et al. | 709/233 |
| 2003/0031151 A1 * | 2/2003 | Sharma et al. | 370/338 |

* cited by examiner

Primary Examiner—Stephen M. D'Agosta
(74) Attorney, Agent, or Firm—Blakely Sokoloff Taylor & Zafman (57) ABSTRACT

In general, one embodiment of the invention is a air monitor adapted to a wireless network. The air monitor enforces policies followed by the wireless network even though it is not involved in the exchange of data between wireless devices of the wireless network such as access points and wireless stations.

12 Claims, 10 Drawing Sheets

| 620 AP IDENTIFIER | 630 MAC ADDRESS | 640 WIRED/WIRELESS |
|---|---|---|
| 11:22:33:44:55:66 | 01:02:03:04:05:06 | WIRED |
| 11:22:33:44:55:66 | 21:22:23:24:25:26 | WIRED |
| ... | ... | ... |

Figure 7

| AP IDENTIFIER 720 | CHANNEL 730 | AP CLASS TYPE 740 | STATUS 750 | NETWORK IDENTIFIER 760 |
|---|---|---|---|---|
| 11:22:33:44:55:66 | 6 | VALID | 1 | ARUBA |
| ... | ... | ... | ... | ... |

| AM ADDRESS (IP) 810 | AM MAC 820 | LOCATION 830 | STATUS 840 |
|---|---|---|---|
| 10.1.1.20 | 31:32:33:34:35:36 | BUILIDNG1.FLOOR1 | 1 |
| ... | ... | ... | ... |

*Figure 8*

| AM ADDRESS (IP) | (AP) BSS ID |
|---|---|
| 10.1.1.20 | 11:22:33:44:55:66 |
| ... | ... |

SYSTEM AND METHOD FOR MONITORING AND ENFORCING POLICY WITHIN A WIRELESS NETWORK

FIELD

Embodiments of the invention relate to the field of wireless communications, in particular, to a mechanism that monitors and enforces policy within a wireless network.

GENERAL BACKGROUND

Over the last decade or so, for most businesses, it has become a necessity for employees to share data over an enterprise network featuring one or more local area networks. To improve efficiency, enhancements have added to a local area network such as remote wireless access. This enhancement provides an important extension in forming a wireless local area network.

Typically, a WLAN supports communications between wireless stations and Access Points (APs). In general, each AP operates as a relay station by supporting communications with both wireless stations being part of a wireless network and resources of a wired network.

In addition to APs and corresponding wireless stations, conventional WLANs feature passive monitoring systems. These systems are configured to simply scan traffic on the WLAN and to conduct performance tasks based on recognized behavior. For example, one performance task may involve measuring signal strength. Another performance task may involve determining whether an AP detected within a wireless coverage area is unauthorized.

If any problems are detected, conventional monitoring systems do not have any capability to correct such problems. Instead, a notification is sent by the system to an administrator. For instance, upon detection of an unauthorized AP, the passive monitoring system currently sends a notification to an administrator to prevent wireless stations in the area from accessing the unauthorized AP. This inability of monitoring systems to automatically handle problems and enforce policy followed by the network may cause undesirable latency in correcting problems and increased overall administrative costs. In addition, mere notification adversely effects overall security of the network by increasing its exposure to hackers.

BRIEF DESCRIPTION OF THE DRAWINGS

The invention may best be understood by referring to the following description and accompanying drawings that are used to illustrate embodiments of the invention.

DETAILED DESCRIPTION

Embodiments of the invention relate to a system and method for monitoring and enforcing policy within a wireless network without being an active participant in the wireless network. In other words, monitoring and enforcement of policy is conducted by a device that is not involved in the establishment of connectivity and exchange of data between Access Points and their corresponding wireless stations. As one illustrative embodiment, policy enforcement within the wireless network is conducted by an Air Monitor and a Management Server, which are described below.

Herein, the invention may be applicable to a variety of wireless networks such as a wireless local area network (WLAN) or wireless personal area network (WPAN). The WLAN may be configured in accordance with any Institute of Electrical and Electronics Engineers (IEEE) 802.11 standard such as an IEEE 802.11b standard entitled "Wireless LAN Medium Access Control (MAC) and Physical Layer (PHY) specifications: Higher-Speed Physical Layer Extension in the 2.4 GHz Band" (IEEE 802.11b, 1999), an IEEE 802.11a standard entitled "Wireless LAN Medium Access Control (MAC) and Physical Layer (PHY) specifications: High-Speed Physical Layer in the 5 GHz Band" (IEEE 802.11a, 1999) or a revised IEEE 802.11 standard "Wireless LAN Medium Access Control (MAC) and Physical Layer (PHY) specifications" (IEEE 802.11, 1999). Of course, the invention may be compliant with systems configured in accordance with High Performance Radio Local Area Networks (HiperLAN) or subsequently published specifications.

Certain details are set forth below in order to provide a thorough understanding of various embodiments of the invention, albeit the invention may be practiced through many embodiments other that those illustrated. Well-known logic and operations are not set forth in detail in order to avoid unnecessarily obscuring this description.

In the following description, certain terminology is used to describe features of the invention. For example, a "component" includes hardware and/or software module(s) that are configured to perform one or more functions. For instance, a "processor" is logic that processes information.

Examples of a processor include a microprocessor, an application specific integrated circuit, a digital signal processor, a micro-controller, a finite state machine, or even combinatorial logic.

A "software module" is executable code such as an operating system, an application, an applet or even a routine. Software modules may be stored in any type of memory, namely suitable storage medium such as a programmable electronic circuit, a semiconductor memory device, a volatile memory (e.g., random access memory, etc.), a non-volatile memory (e.g., read-only memory, flash memory, etc.), a floppy diskette, an optical disk (e.g., compact disk or digital versatile disc "DVD"), a hard drive disk, tape, or any kind of interconnect (defined below).

An "interconnect" is generally defined as an information-carrying medium that establishes a communication pathway. Examples of the medium include a physical medium (e.g., electrical wire, optical fiber, cable, bus traces, etc.) or a wireless medium (e.g., air in combination with wireless signaling technology).

"Information" is defined as data, address, control or any combination thereof. For transmission, information may be transmitted as a message, namely a collection of bits in a predetermined format. One particular type of message is a frame including a header and a payload, each having a predetermined number of bits of information.

I. General Architecture

Figure 1:
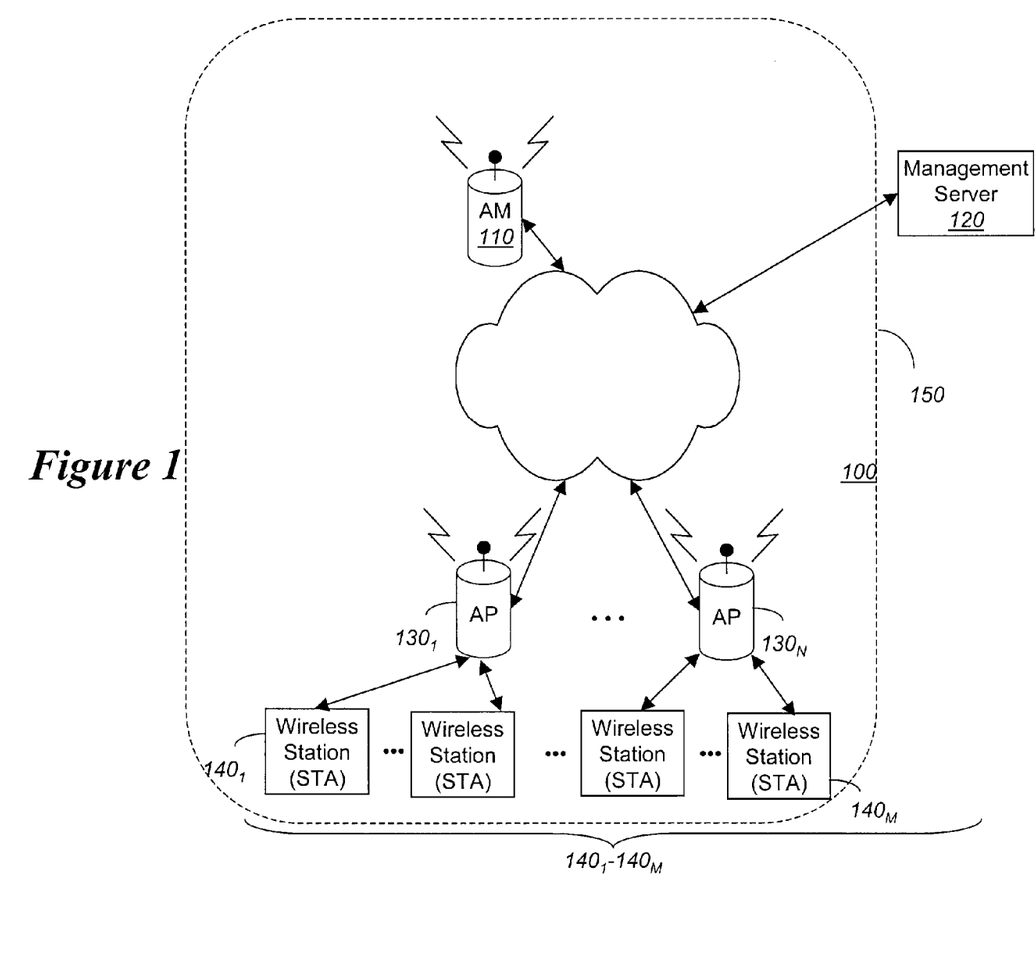
FIG. 1 is an exemplary embodiment of an enterprise network featuring a wireless network in accordance with the invention.

Referring to FIG. 1, an exemplary embodiment of an enterprise network featuring a wireless network 100 in accordance with the invention is illustrated. Herein, wireless network 100 comprises an Air Monitor 110, a Management Server 120, one or more Access Points (APs) $130_1$–$130_N$ ($N \geq 1$), and one or more wireless stations (STAs) $140_1$–$140_M$ ($M \geq 1$), which are in communication with APs $130_1$–$130_N$. Of course, it is contemplated that more than one Air Monitor may be positioned within wireless network 100.

Air Monitor (AM) 110 detects any AP within its signal coverage area 150, including both valid APs as well as unauthorized APs. A "Valid" AP is an authorized AP coupled to and resident of a wired portion of the enterprise network. An unauthorized AP can be classified into one or a selected number of classes. For this embodiment, there are three classes for unauthorized APs; namely, "Rogue", "Unsecured", and "Interfering".

Figure 10:
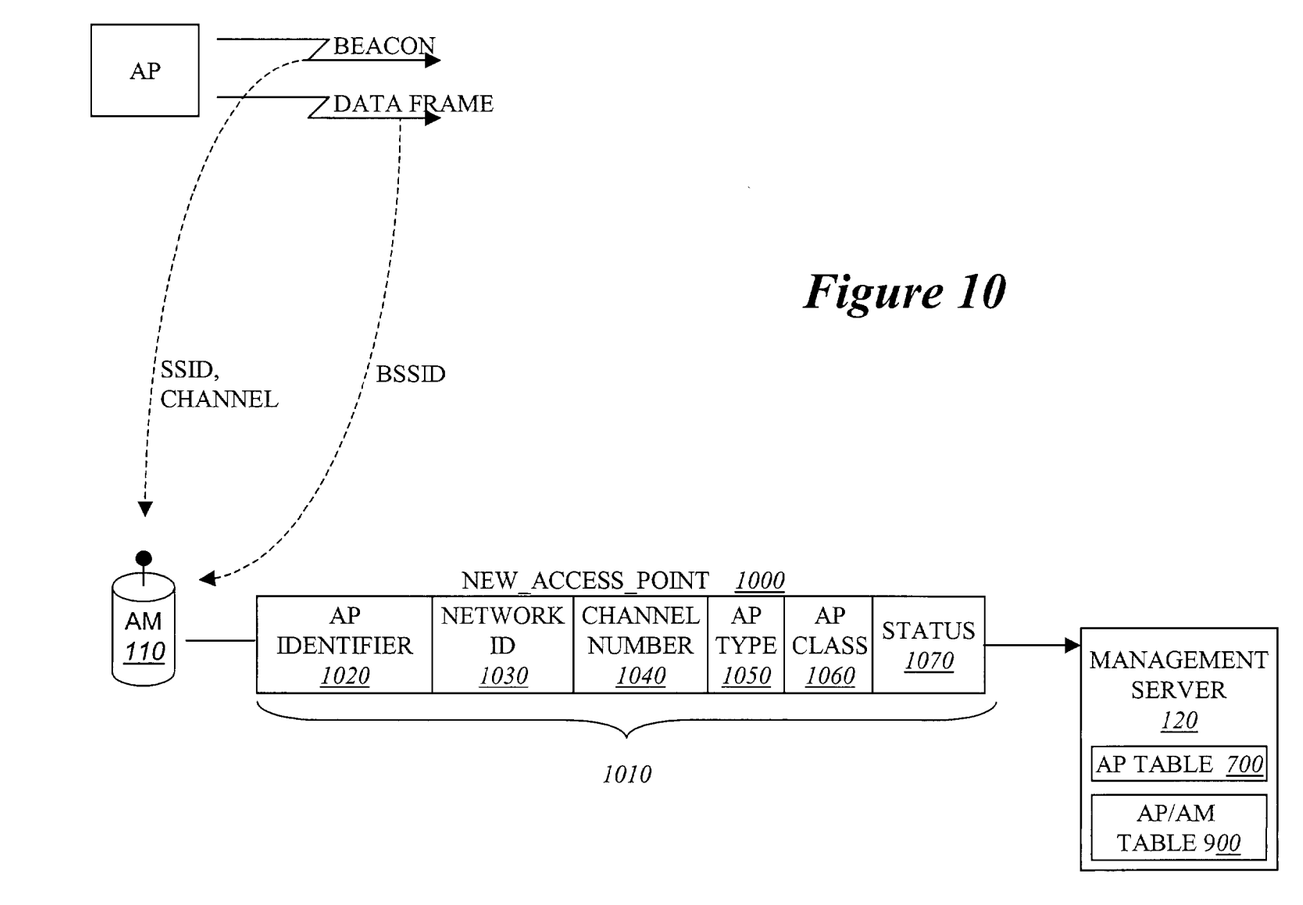
FIG. 10 is an exemplary embodiment of a communication protocol for AP classification between the Air Monitor and the Management Server of FIG. 1.

A "Rogue AP" or "RAP" is an initial class set by Management Server 120 upon receipt of a NEW_ACCESS_POINT message by Air Monitor 110 as described in FIG. 10. An "Unsecured AP" is an AP that is unknowingly or maliciously installed within the enterprise network itself. This allows clients to illegally access resources within the enterprise network. An "Interfering AP" is an AP that is installed on another network, but is within a coverage area of the enterprise network. This is a common scenario in multi-tenancy environments where APs from other networks are visible to each other.

Figure 2:
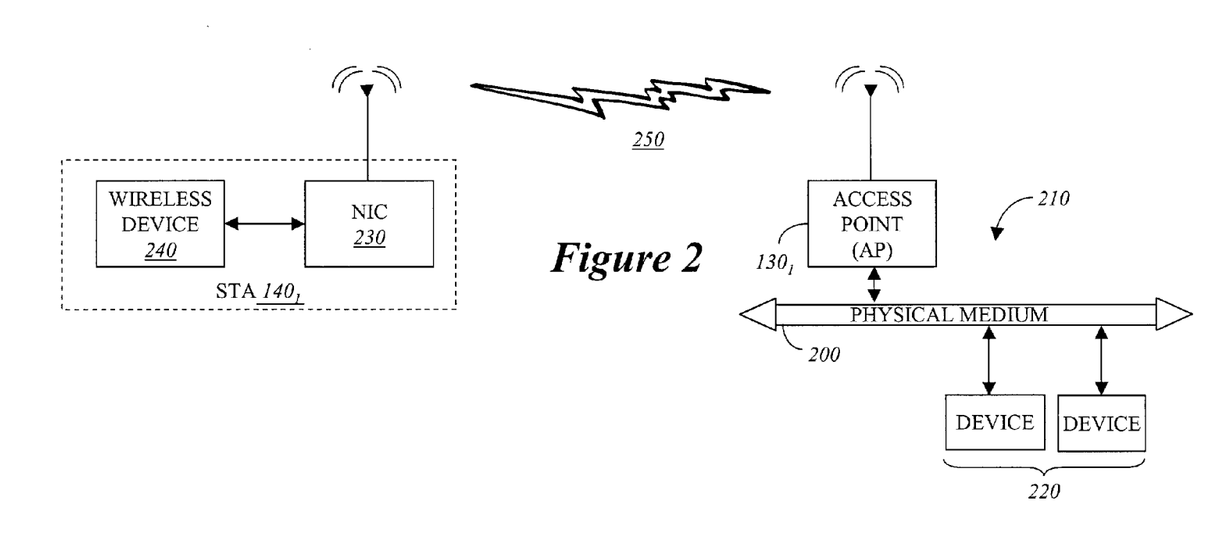
FIG. 2 is an exemplary embodiment of an Access Point of the WLAN of FIG. 1 in communication with a wireless station.

As shown in FIG. 2, each AP $130_1$, . . . , or $130_N$ supports bi-directional communications by (i) receiving data frames and transmitting data from these frames onto a physical medium 200 that forms part of a wired network 210 and (ii) receiving data from wired network 210 and transmitting data frames to one or more targeted STAs $140_1$, . . . , $140_M$. Wired network 210 can be of any type of wired network, including but not limited or restricted to Ethernet, Token Ring, Asynchronous Transfer Mode (ATM) or the like. Moreover, wired network 210 features resources that are available for users of wireless network 100. Such resources may include devices 220 for data storage, which are coupled to physical medium 200.

STA $140_1$ includes a removable, wireless network interface card (NIC) 230 that is separate from or employed within a wireless device 240 that processes information (e.g., computer, personal digital assistant "PDA", telephone, alphanumeric pager, etc.). Normally, NIC 230 comprises a wireless transceiver, although it is contemplated that NIC 230 may feature only receive (RX) or transmit (TX) functionality such that only a receiver or transmitter is implemented.

STA $140_1$ communicates with and accesses information from AP $130_1$ over the air 250 in accordance with IEEE 802.11 communications protocol or another wireless networking protocol. Hence, AP $130_1$ generally operates as a transparent bridge connecting both a wireless network featuring STA $140_1$ with wired network 210.

Referring back to FIG. 1, Air Monitor (AM) 110 comprises a policy enforcement component implemented within a device that also features components enabling wireless communications (e.g., wireless NIC). The policy enforcement component may be one or more software modules executed by a processor within the device. For this embodiment, AM 110 constantly scans different frequency channels and maintains information about all APs $130_1$–$130_N$ and STAs $140_1$–$140_M$ in wireless network 100. Generally, AM 110 monitors wireless network 100 to extract information from wireless frames as described in FIGS. 4, 5A & 5B described below. Examples of wireless frames include, but are limited or restricted to IEEE 802.11 data frames, Beacon frames, HiperLAN frames or the like. This information may be used to influence the behavior of wireless network 100.

Figure 3:
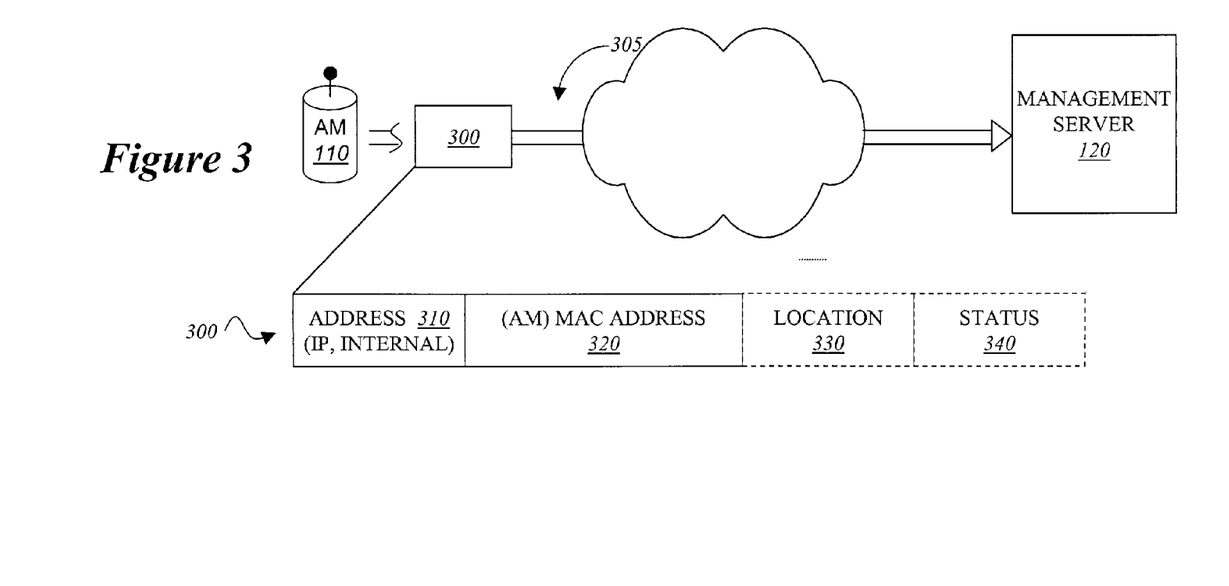
FIG. 3 is an exemplary embodiment of the registration process by an Air Monitor with a Management Server.

Upon start-up, AM 110 registers with Management Server 120. According to one embodiment, as shown in FIG. 3, AM 110 registers by sending an AM_REGISTRATION 300 to Management Server 120 over interconnect 305. AM_REGISTRATION message 300 comprises at least a unique address 310 (e.g., Internet Protocol "IP" address, internal network address, etc.) and a Media Access Control (MAC) address 320 for AM 110. Of course, other optional information may include a location 330 of AM 110 and status information 340 (e.g., active or inactive).

Figure 4:
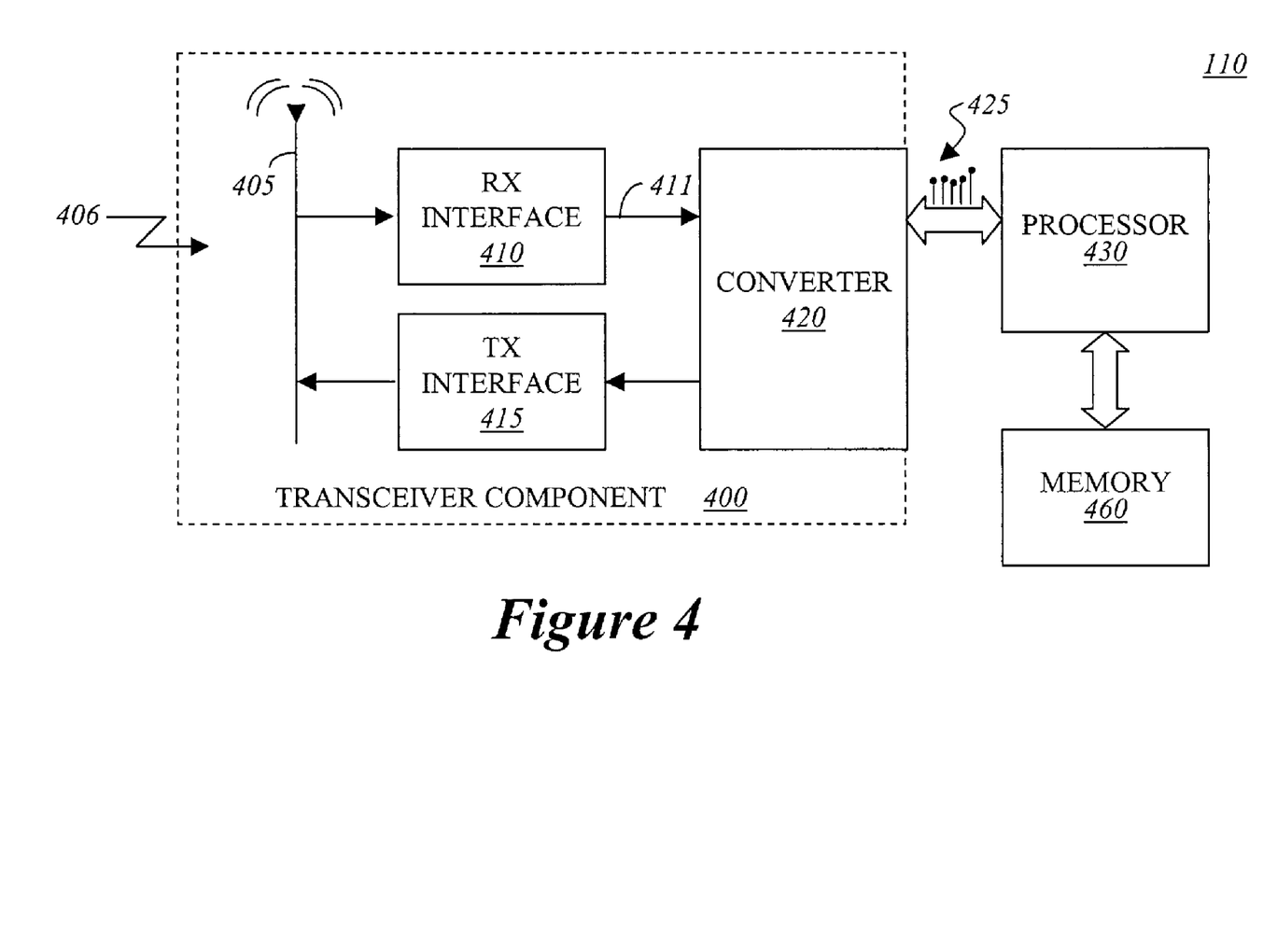
FIG. 4 is an exemplary embodiment of an Air Monitor of FIG. 1.

Referring to FIG. 4, an exemplary embodiment of AM 110 of FIG. 1 is shown. AM 110 comprises a transceiver component 400, a processor component 430 and a memory component 460. Processor 430 and memory 460 are used to extract information from signals transmitted to/from APs $130_1$–$130_N$ of FIG. 1, to measure signal strength, and to maintain one or more data structures that can be used to influence the behavior of wireless network 100.

As shown in this embodiment, transceiver component 400 comprises an antenna 405, a RX interface 410, a TX interface 415 and a converter 420. Converter 420 may be implemented as a component that can perform both analog-to-digital signal conversion as well as digital-to-analog signal conversion. Of course, it is contemplated that converter 420 may include analog-to-digital converter and/or digital-to-analog converter. Where both converters are provided, they are separate components.

More specifically, as shown in FIG. 4, antenna 405 receives an incoming data stream 406. In one embodiment, data stream 406 includes one or more wireless frames such as a Beacon frame 500 of FIG. 5A and an IEEE 802.11 data frame 550 of FIG. 5B. The information within these frames is encoded and carried within a frequency channel that is located within a carrier frequency band. For ths embodiment, the carrier frequency band is located within typical radio frequency (RF) band of frequencies. For example, the RF band may generally fall within an approximate range of 2.4–2.5 GHz or perhaps an approximate range of 5–5.25 GHz. It is contemplated, though, that the invention may be applied to any frequency range.

The RX interface 410 is configured to isolate the frequency channel on which data is carried from all the other frequencies received on antenna 405. This may be accomplished through a tunable filter tuned to a center frequency of a channel of interest. The data channel undergoes a frequency shifting from the carrier band to baseband and a resulting analog radio signal 411, which is routed to converter 420.

In one embodiment, converter 420 samples baseband analog radio signal 411, which results in a series of digital samples 425. Processor 430 performs a demodulation operation on the digitally sampled baseband signal 425 to recover information from the wireless frames. Typically, a fixed number of demodulation protocols may be stored in memory 460. For instance, AM 110 may support one of more of IEEE 802.11, 802.11a and 802.11b demodulation protocols as well as other protocol types.

The type of information recovered by AM 110 enables a variety of policies to be enforced. For example, such information may enable an AP to be effectively turned off if classified as an Unsecured AP. Other examples are set forth in the policy extension section described below.

Figure 5A:
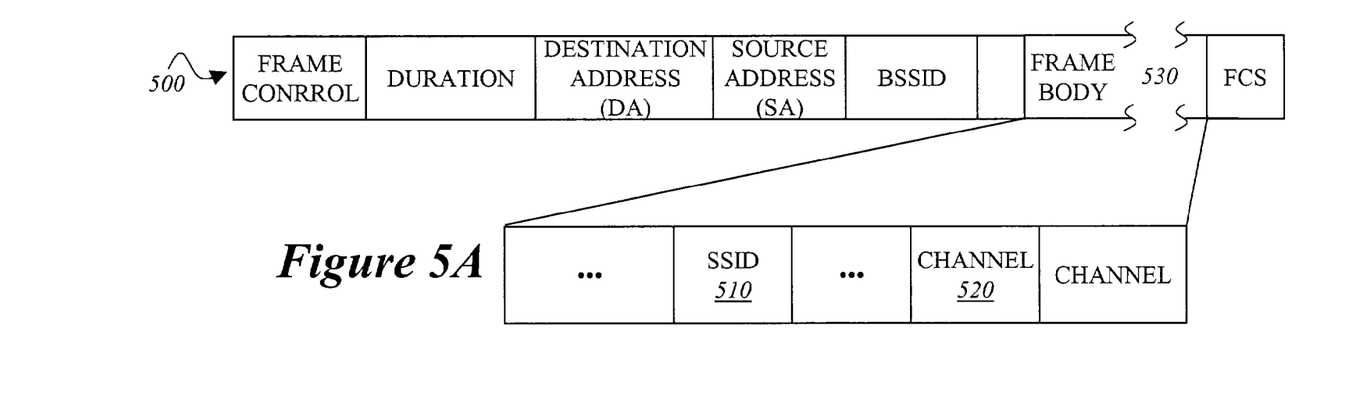
FIG. 5A is an exemplary embodiment of a Beacon frame detected by the Air Monitor of FIG. 4.
Figure 5B:
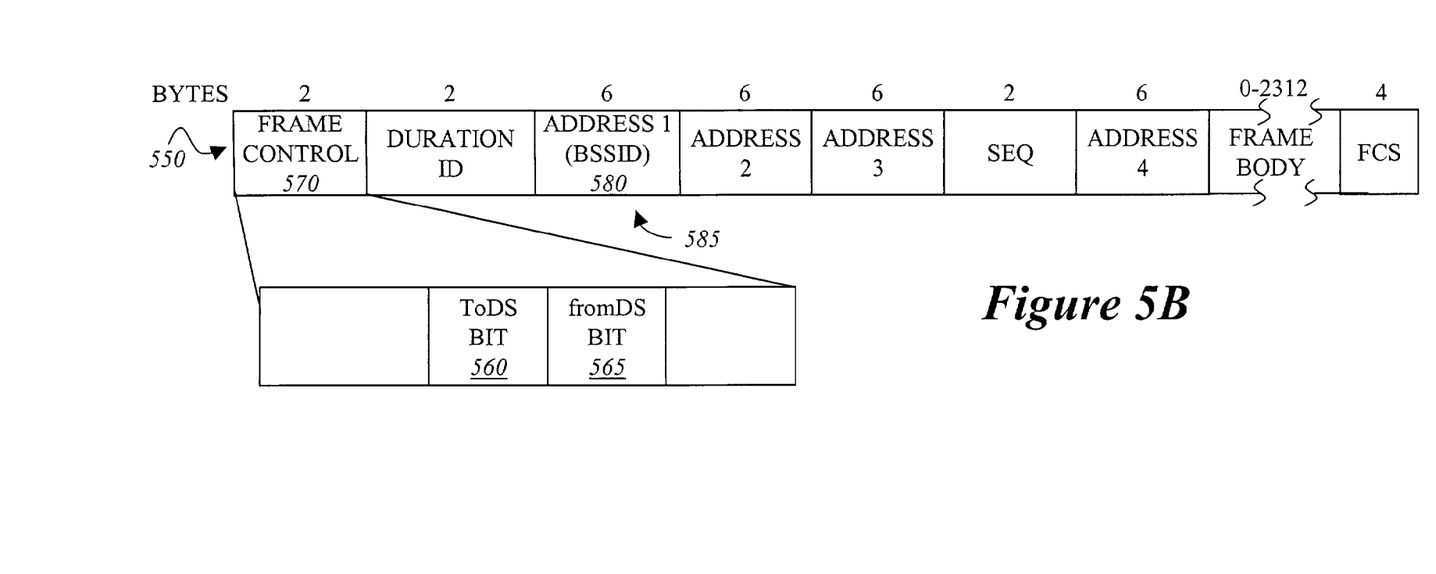
FIG. 5B is an exemplary embodiment of an IEEE 802.11 data frame detected by the Air Monitor of FIG. 4.

For one embodiment, as shown in FIGS. 5A and 5B, the information may be recovered from Beacon frame 500 and IEEE 802.11 data frame 550. After recovery, the information may be stored internally within memory 460 or transmitted to memory within Management Server 120.

For instance, a Service Set Identity (SSID) 510 and a channel number 520 may be recovered from a frame body 530 of Beacon frame 500. Additionally, values of toDS bit 560 and FromDS bit 565 may be recovered from a frame control portion 570 of data frame 550. An identifier (e.g., Basic Service Set Identifier "BSSID") 580 of a detected AP may be recovered from an address field 585 of data frame 550. The signal strength perceived by AM 110 for data frame 550 may be measured by AM 110 and such value stored.

Referring back to FIG. 1, Management Server 120 is software running on a central management system that manages each and every AM installed in the enterprise network. Each Air Monitor (e.g., AM 110) is configured with a server address and registers with Management Server 120 at start-up as described in FIG. 3. Of course, for small scale deployment, functionality of Management Server 120 can be merged into AM 110.

Figure 6:
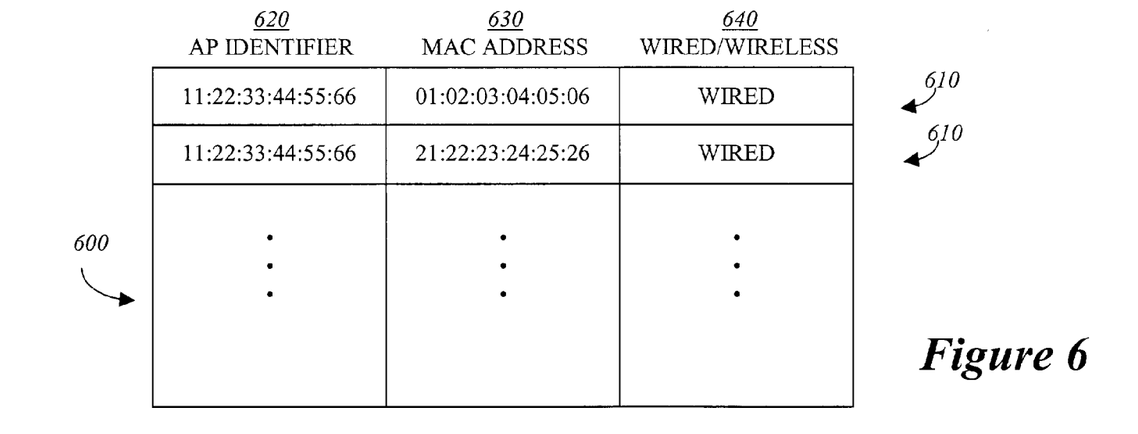
FIG. 6 is an exemplary embodiment of a data structure (referred to as a "Station Table") continuously updated and stored by the Air Monitor of FIG. 4.

Referring to FIG. 6, an exemplary embodiment of a data structure 600 (referred to as a "Station Table") continuously updated and stored by AM 110 of FIG. 4 is shown. Station Table 600 maintains information associated with all APs being monitored by an Air Monitor (e.g., AM 110). Such information is recovered from wireless frames received by or output from any of the monitored APs.

As shown in this embodiment, each entry 610 of Station Table 600 comprises a plurality of fields. A first field is configured to contain an identifier 620 of an AP being monitored by the Air Monitor (referred to as "AP identifier"). AP identifier 620 may include the BSSID of the monitored AP. A second field is configured to contain a MAC address 630 corresponding to either a destination address or source address contained in the wireless frame.

Station Table 600 further comprises a third field that contains information 640 to indicate whether a source address or destination address in the wireless frame is a "wireless MAC address" or a "wired MAC address". More specifically, the Air Monitor constantly classifies source and destination addresses in the wireless frames. The destination address (DA) is deemed to be a "wireless MAC address" and the source address is deemed to be a "wired MAC address" if the frame transfer occurs from the AP to one of its STAs. Similarly, DA is deemed to be a "wired MAC address" and the source address is deemed to be a "wireless MAC address" if the frame transfer occurs from one of the STAs to the AP.

In general, this classification can accomplished by analyzing fromDS and toDS bits within a header of the wireless frame. If fromDS bit is set and toDS bit is not set, SA is a wireless MAC address and DA is a wired MAC address. If toDS bit is set and fromDS bit is not set, SA is a wired MAC address and DA is a wireless MAC address.

Figure 7:
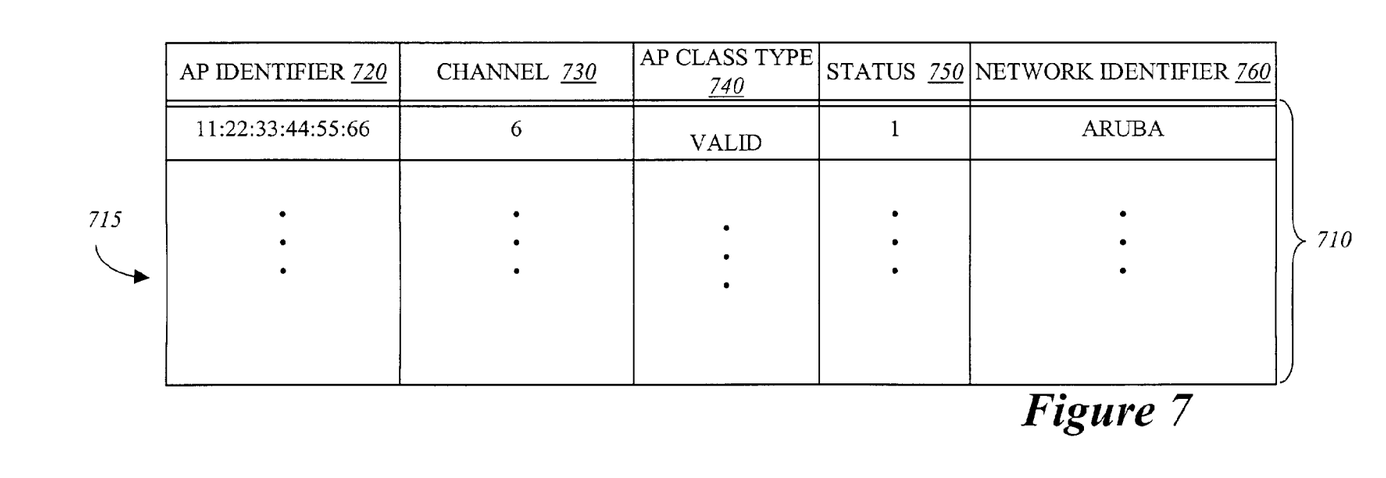
FIG. 7 is an exemplary embodiment of a data structure (referred to as an "AP Table") maintained and stored by the Management Server of FIG. 1.

Referring to FIG. 7, an exemplary embodiment of a data structure maintained and stored by Management Server 120 of FIG. 1 is shown. This data structure, referred to as an AP Table 700, maintains baseline information for all APs installed in the wireless network. This information can be manually input by an administrator or automatically populated by placing all Air Monitors of the wireless network into a LEARN mode. In LEARN mode, each Air Monitor collects information associated with the APs that are within its coverage range and routes such information to update AP Table 700.

As shown, each entry 710 of AP Table 700 contains information associated with an AP of the wireless network. As one embodiment, at least one entry 715 includes AP identifier 620, a channel number 730, an AP class type value 740 and a Status value 750. AP identifier 720 is the unique value that identifies a specific, monitored AP. An example of AP identifier 720 is equivalent to the BSSID 620 concurrently stored in Station Table 600 of FIG. 6. Channel number 730 indicates the particular channel over which the wireless frames associated with the particular AP. AP class type value 740 indicates the current classification of the particular AP such as Valid, Rogue, Unsecured or Interfering. Status value 750 is a Boolean value (0,1) that merely indicates whether the AP is active (1) or inactive (0). As an optional feature, entry 715 may further include a network identifier 760 (e.g., SSID).

Figure 8:
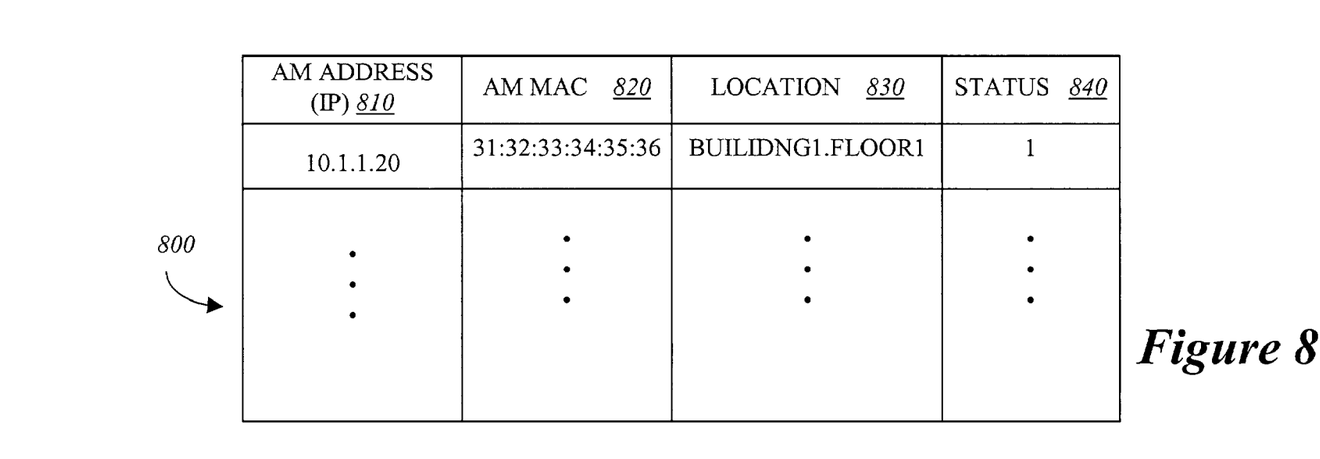
FIG. 8 is an exemplary embodiment of a data structure (referred to as an "AM Table") maintained and stored by the Management Server of FIG. 1.

Referring now to FIG. 8, an exemplary embodiment of a data structure 800 (referred to as an "AM Table") maintained and stored by Management Server 120 is shown. AM Table 800 contains all Air Monitors registered by Management Server 120. Each entry of AM table 800 is associated with a different Air Monitor. For instance, a first entry comprises a first field to contain unique address 810 for one of the Air Monitors (e.g., Internet Protocol "IP" address, internal network address, etc.) and a second field to contain Media Access Control (MAC) address 820 of that Air Monitor. Optionally, AM Table 800 further comprises a field to contain information 830 indicating a location of the Air Monitor and a field to contain status information 840 as to whether the Air Monitor is active or inactive.

Figure 9:
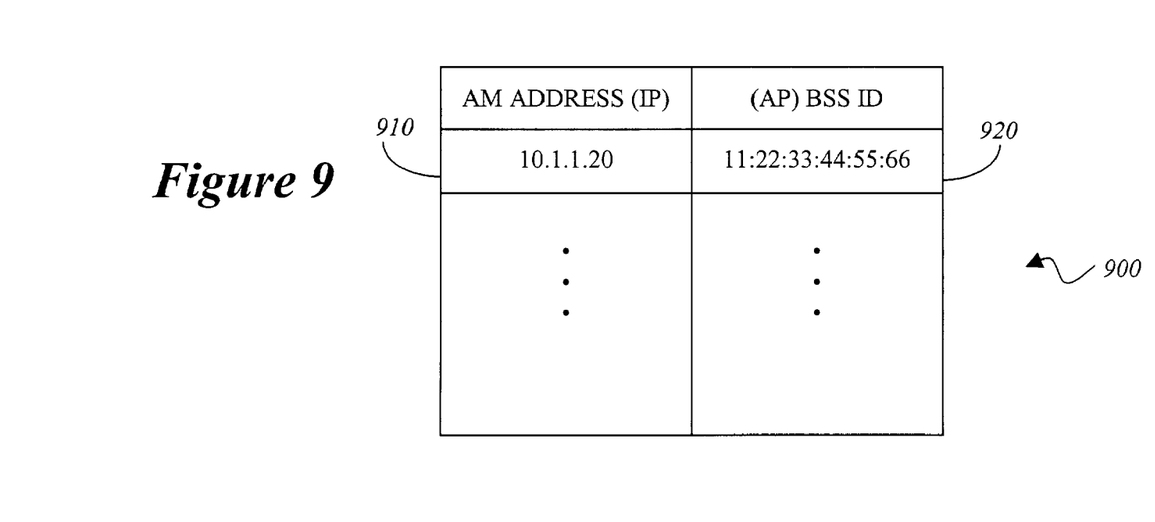
FIG. 9 is an exemplary embodiment of a data structure (referred to as an "AP/AM Table") maintained and stored by the Management Server of FIG. 1.

Referring to FIG. 9, an exemplary embodiment of a data structure 900 (referred to as "AP/AM Table") maintained and stored by Management Server 120 of FIG. 1 is shown. This table merely maintains what AP is being monitored by which Air Monitor. Each entry of AP/AM Table 900 comprises a first field 910 to contain AM address 810 found in AP Table 800 of FIG. 8 and a second field 920 to contain the AP identifier 720 found in AP Table 700 of FIG. 7, which is provided to the Management Server by the Air Monitor.

II. Communication Protocols

Referring to FIG. 10, an exemplary embodiment of a communication protocol for AP classification between Air Monitor (AM) 110 and Management Server 120 of FIG. 1 is shown. AM 110 is constantly monitoring the wireless network to detect APs that is active. AM 110 does this by extracting (i) BSSID and measuring signal strength perceived from every wireless data frame transmitted or received by an AP and (ii) SSID and channel information from its Beacon frame. Whenever a new AP is detected, AM 110 sends a NEW_ACCESS_POINT message 1000 to Management Server 120.

NEW_ACCESS_POINT message 1000 comprises a plurality of parameters 1010 such as, for example, an AP identifier 1020, an optional network identifier 1030, a channel number 1040, an AP type parameter 1050, an AP class parameter 1060 and a status parameter 1070.

In one embodiment, AP identifier 1020 is a BSSID, namely a MAC address that uniquely identifies the new AP. Network identifier 1030 is an alphanumeric character string that identifies the network to which the new AP is communicating (e.g., SSID). Channel number 1040 indicates the particular channel that the detected frame from/to the new AP is received on.

AP type parameter 1050 indicates a manufacturer, make or model of the new AP. For example, AP Type parameter 1050 may indicate that the AP is a software-based AP or may indicate that it is manufactured or sold by a particular company such as Cisco Systems, Inc. of San Jose, Calif.

AP class parameter 1060 indicates a particular classification of the AP such as Valid, Rogue, Unsecured or Interfering as described above. This information enables Management Server 120 to detect if AM 110 has up-to-date AP classification. If not, Management Server 120 sends a message to AM 110 with the updated AP Classification.

AP status parameter 1070 simply indicates whether the new AP is active or inactive.

When Management Server 120 receives NEW_ACCESS_POINT message 1000, it compares AP identifier 1020 with the baseline maintained in AP Table 700 of FIG. 7. If the new AP is listed in AP Table 700 as a "Valid" AP, the message is ignored. If the new AP is not located in AP Table 700, Management Server 120 updates AP Table 700 with information associated with the new AP and initially classes the new AP as a "Rogue" AP by setting AP class type parameter to "Rogue". Management Server 120 also updates AP/AM Table 900 of FIG. 9 to indicate that the new AP is being monitored by AM 110.

Figure 11:
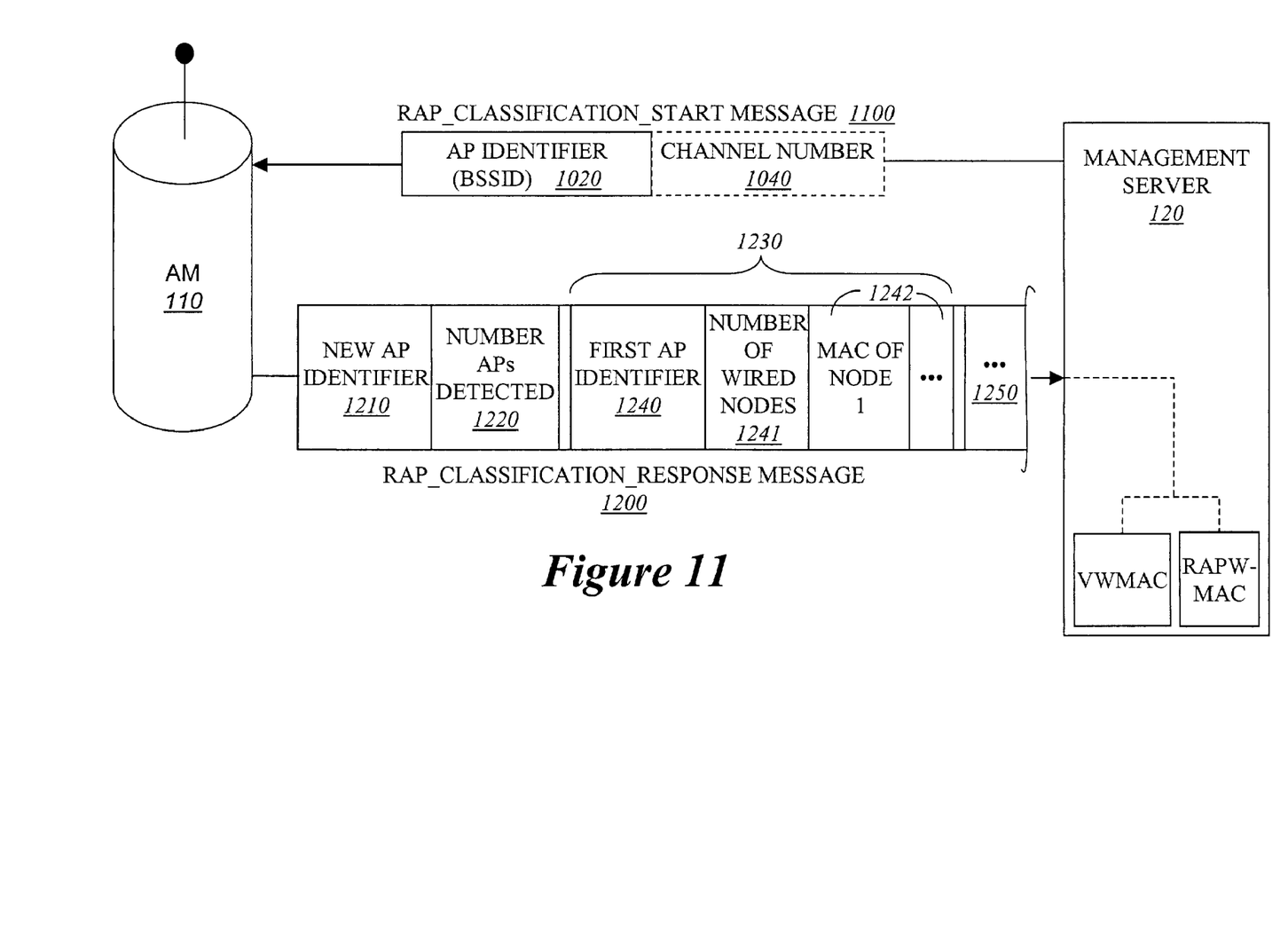
FIG. 11 is an exemplary embodiment of a communication protocol for Rogue AP classification between the Air Monitor and the Management Server of FIG. 1.

Referring to FIG. 11, an exemplary embodiment of a communication protocol for Rogue AP classification between AM 110 and Management Server 120 of FIG. 1 is shown. When new AP is classified as a Rogue AP, Management Server 120 does a query to AP/AM Table 900 of FIG. 9 to find out all AMs monitoring the new AP. Management Server 120 next sends a RAP_CLASSIFICATION_START message 1100 to AM 110. RAP_CLASSIFICATION_START message 1100 comprises at least the AP identifier 1020 of the new AP that has to be further classified. Optionally, RAP_CLASSIFICATION_START message 1100 further comprises channel number 1040.

Upon receiving RAP_CLASSIFICATION_START message 1100, AM 110 stops scanning all frequency channels supported by the wireless network and tunes to the channel that new AP is on. The channel information is known by AM 110 based on contents of Station Table 600 of FIG. 6 stored by AM 110. Of course, channel information may be included in RAP_CLASSIFICATION_START message 1100 as well.

For a specified period of time, AM 110 performs MAC Address Classification to update classifications for all APs being monitored. At the end of this time period, AM 110 sends a RAP_CLASSIFICATION_RESPONSE message 1200 to Management Server 120 that provides information contained within Station Table 600 of FIG. 6.

In particular, RAP_CLASSIFICATION_RESPONSE message 1200 comprises a plurality of fields. A first field 1210 contains the AP identifier of the new AP for which the RAP_CLASSIFICATION_START message 1100 of FIG. 1 was constructed. A second field 1220 contains a number of APs detected by AM 110. In addition, a first series of fields 1230 includes an AP identifier 1240 of a first AP of the detected APs. AP identifier 1240 may include a BSSID. Next, a number of wired nodes 1241 (e.g., an enterprise server such as a file server, email server, web server connected to the wired network) associated with the particular BSSID and MAC addresses 1242 of each of these wired nodes is provided. Additional series of fields 1250 are provides for each of the detected APs.

Management Server 120 collects information from the RAP_CLASSIFICATION_RESPONSE message 1200 from AM 110 and classifies MAC Addresses associated with the nodes in two groupings: Valid Wired MAC Addresses (VWMAC) grouping and Rogue AP Wired MAC Addresses (RAPWMAC) grouping. VWMAC has all wired MAC Addresses seen for Valid APs (VWMAC are wired MAC addresses associated with Valid APs, so VWMAC are enterprise wired MAC Addresses. RAPWMAC includes all wired MAC Addresses for Rogue APs.

If there are common MAC Addresses in these two buckets, the Rogue AP is classified as Unsecured Access Point (UAP). Otherwise it is classified as Interfering Access Point (IAP). Management Server 120 updates AP Table 700 of FIG. 7 with the appropriate new AP Class type parameter.

Figure 12:
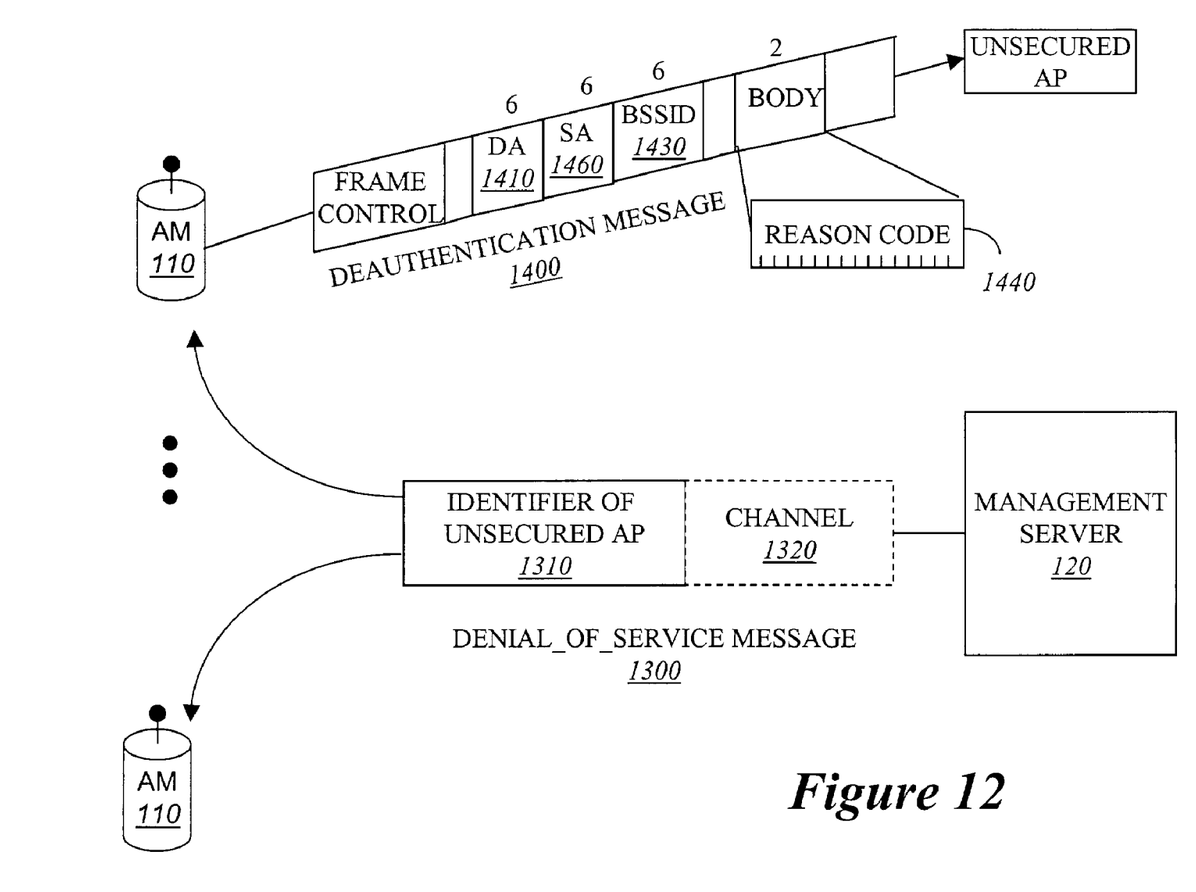
FIG. 12 is an exemplary embodiment of a communication protocol for deactivating an Unsecured AP.

Referring now to FIG. 12, an exemplary embodiment of a communication protocol for deactivating an Unsecured AP is shown. Once a newly detected AP is classified as an Unsecured AP, Management Server 120 sends a DENIAL_OF_SERVICE message 1300 to all AMs monitoring the new AP. The DENIAL_OF_SERVICE message 1300 comprises an identifier 1310 of the Unsecured AP (e.g., BSSID of Unsecured AP). Of course, DENIAL_OF_SERVICE message 1300 may further include a channel number 1320 to which the AMs are communicating with the Unsecured AP.

Upon receiving DENIAL_OF_SERVICE message 1300, whenever AM detects a data frame with fromDS bit set on the Unsecured AP domain, the AM sends a DEAUTHENTICATION message 1400 to Unsecured AP on behalf of a station that was the destination of the data frame. As shown in FIG. 14, differing from IEEE 802.11 data frames as shown in FIG. 5B, DEAUTHENTICATION message 1400 comprises three address fields 1410, 1420, 1430 in which DA field 1410 contains the BSSID of the Unsecured AP. A reason code 1440 is loaded into a two-byte body portion of DEAUTHENTICATION message 1400 to indicate the reason for deauthentication.

For clarity sake, presume that AM 110 detects an IEEE 802.11 data frame with the following attributes: (1) FromDS bit is set; ToDS bit is not set; Address 1 (DA) is equal to 000000000001; Address 2 (BSSID) is equal to 000000000002; Address 3 (SA) is equal to 000000000003. In response to a DENIAL_OF_SERVICE message 1300, AM 110 will send the following DEAUTHENTICATION message on the channel: Address1=000000000002; Address2=000000000003; Address3= 000000000002; Reason Code=1.

DEAUTHENTICATION message 1400 is sent by AM 110 on behalf of STA associated with Unsecured AP to the Unsecured AP. On receiving this message, the Unsecured AP removes STA from its tables, but STA assumes that it is connected to UAP. STA will keep send frames to the Unsecured AP but the Unsecured AP will drop them.

In the event that DEAUTHENTICATION message 1400 is sent to a wireless station in lieu of an AP, the DA and SA of DEAUTHENTICATION message 1400 are swapped.

III. Policy Extension

Besides turning off an AP based on classification, other policy enforcement operations may be supported by AM 110, based on the below-described communication protocol between AM 110 and Management Server 120 of FIG. 1. Such policy enforcement operations may include the following:

1. Allow wireless stations (STAs) with weak signal strength to automatically associate with an AP with better signal strength—If a wireless station (e.g., STA $140_1$ with weak signal strength is detected, Management Server 120 can instruct AM 110 to send DEAUTHENTICATION message 1400 of FIG. 12 to STA $140_1$ on behalf of AP $130_1$ that it is currently associated with. This should cause STA $140_1$ to rescan wireless network 100 for an AP with better signal strength.

2. AP Load balancing—If AM 110 detects two APs in its domain and one of them is overloaded, it can send DEAUTHENTICATION message 1400 of FIG. 12 to one or more wireless stations (STAs) in communication with the overloaded AP to force the STAs to look for another AP. AM 110 can wait for the selected STAs to be idle for some time to minimize impact.

3. Allow a wireless station experiencing interference to switch to different channel—If excessive interference is detected on a wireless station (STA), Management Server 120 can instruct AM 110 to send DEAUTHENTICATION message 1400 of FIG. 12 to STA on behalf of an AP it is associated with. This can cause the STA to rescan and associate with the AP on a different channel.

4. Disrupt a channel selectively or completely in a certain location—All APs on the channel are classified as "Unsecured" APs. This can be used to enforce policies like use subset of available channels, use non-overlapping channels, etc.

5. Disrupt AP with Wired Equivalent Privacy (WEP, IEEE 802.11) or Extensible Authentication Protocol (EAP, IEEE 802.11) disabled—If an AP advertises WEP or EAP NOT required in beacon, it could be classified as an Unsecured AP.

6. Disrupt AP or wireless station (STA) using bad WEP encryption IV values—If AM 110 detects an AP or STA using WEP encryption IV that can be used to decrypt keys by application like Air Snort, AM 110 can disassociate from the STA (if STA is the culprit) or from all STA associated with AP (if AP is the culprit).

7. Turn off wireless station (STA) with WEP disabled—If an STA associates without WEP, Management Server 120 can instruct AM 110 to treat it as a Rogue STA.

8. Turn off misconfigured APs—Classify them as Unsecured APs in response to detection of any type of configuration error detected from a wireless frame.

9. Controlling channel usage in a multi-tenancy environment—In a multi-tenancy environment, channel usage policy can be enforced by denying service through an Interfering AP if it is using invalid channels.

10. Disrupt illegal access of WLAN in a hotspot environment—Another application of Rogue wireless station (STA) management is when a STA tries to use WLAN in a hotspot environment without authorization. In this situation, AM 110 can send DEAUTHENTICATION message 1400 of FIG. 12 to the AP.

11. Detect and disrupt man in the middle attacks with Rogue APs in hot spot environment—Another application of DENIA_OF_SERVICE message described below.

12. Detect and disrupt association flood DoS attack on a valid AP—If AM 110 detects rate of Association Request exceeding a threshold, it can send disassociate to the AP to clear AP association tables.

13. Disrupt wireless station (STA) using WLAN to initiate DoS attacks like TCP SYN flood, Ping sweeps, etc.

14. Disrupt a wireless station (STA) from associating with an outside AP—This can be easily done, as outside AP will be detected in the system as an Interfering AP.

15. Identify and disrupt devices that probe the network to discover APs—If a wireless station (STA) sends repeated probe request messages or sends association message to multiple APs one at a time, AM 110 can mark the STA as a rogue STA.

16. Detect and Disrupt AP impersonation—This is done by maintaining signal strength as seen by every AM monitoring a valid AP. Impersonating AP will have different signal strength signature. This can be used to detect impersonating APs and all traffic AM 110 sees from impersonating AP (signal strength) can be used to launch DoS from that AP. Impersonating APs can also be identified by STA list that are associated with it.

17. Partition WLAN Network—Control access to Valid APs based on time of day policy or other policy so that part of enterprise network can be enabled and other disabled.

18. Partition WLAN Port—Turning off access to a wireless station (STA) based on any of the rules discussed above is equivalent to partitioning a port in a wired network.

19. Impersonating STA Detection and DoS—Detect wireless station (STA) impersonating a Valid STA by spoofing valid STA MAC Address. Once impersonating STA is detected, it is denied access to WLAN. Impersonating STA is defined as same MAC Address associated with two different APs at the same time. These two STAs can be detected by different Air Monitors.

20. Enforcement of other policies based 802.11 specific attributes available in 802.11 frames or generic attributes like time day, duration of access, etc.

a. Time based access can be enforced. One example of policy is a wireless station (STA) are not allowed to access WLAN after business hours. WLAN need not be turned off, only AM 110 have to be configured to enforce the policy.

b. Enforce association rates for all STA in the enterprise network. If a STA associates with an invalid association rate, it can be disrupted. If an AP advertises an invalid association rate, it can be disrupted.

Figure 13:
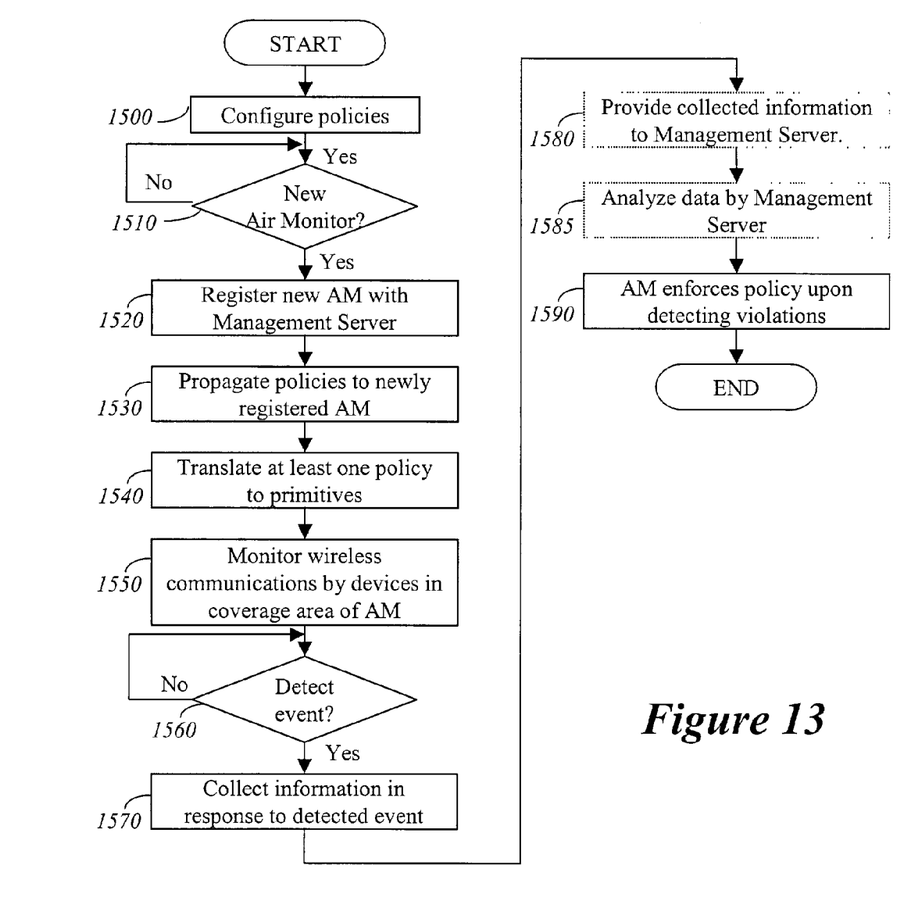
FIG. 13 is an exemplary flowchart of operations for enforcement of policy within a wireless network of the invention.

Referring to FIG. 13, a general flowchart of operations for enforcement policy within a wireless network of the invention is shown. Initially, policies are configured on the Management Server (block 1500). When a new Air Monitor (AM) becomes active within the enterprise network, it registers with the Management Server (blocks 1510 and 1520). As a result, one or more policies are propagated to the registered Air Monitor (block 1530).

The Air Monitor translates at least one propagated policy into primitives for which information is collected (block 1540). On a continuous basis, the Air Monitor monitors communications between devices on the wireless network and commences collection of information in response to detecting a particular event (blocks 1550 and 1560). Thereafter, for certain policies, the collected information is provided to the Management Server, which analyzes the collected data to determine if any policy violations have occurred (blocks 1570, 1580 and 1585). For other policies, no analysis is needed. Rather, policy can be enforced by the Air Monitor based on recovery of the data itself (blocks 1570 and 1590).

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. An apparatus adapted to a wireless network, comprising;
   a transceiver to receive a wireless frame propagating over a prescribed signal coverage area between wireless devices of the wireless network, one of the wireless devices being an Access Point; and
   at least one component to process information extracted from the wireless frame and to enforce a policy followed by the wireless network even though the apparatus has no involvement in an exchange of data between the wireless devices of the wireless network, the at least one component includes a processor and a memory adapted to store a table including a plurality or entries, at least one entry of the plurality of entries including (1) a media access control (MAC) address associated with an address of the wireless frame, and (2) information to indicate whether the MAC address is a wireless MAC address or a wired MAC, the processor to classify the MAC address of the wireless frame as either the wireless MAC address or the wired MAC address based on a value of a fromDS bit and a toDS hit in a header of the wireless frame, the fromDS bit is set and the toDS bit is not set if the MAC address is a wireless MAC address.

2. The apparatus of claim 1, wherein the at least one entry of the table stored in the memory further comprises (3) an identifier of the Access Point.

3. The apparatus of claim 2, wherein the identifier of the Access Point is a Basic Service Set Identifier (BSSID).

4. The apparatus of claim 1, wherein the MAC address classified as the wireless MAC address is a destination MAC address.

5. The apparatus of claim 4, wherein the at least one component classifies a source MAC address of the wireless frame a wired MAC address when the fromDS bit is set and the toDS bit is not set if the MAC address is a wireless MAC address.

6. A method comprising:
   detecting an Access Point (AP) previously undetected within a signal coverage area;
   extracting information from a wireless frame transmitted from the AP, the extracted information includes a Basic Service Set Identifier (BSSID) of the AP, a Service Set Identity (SSID) to identify a network that the AP is communicating, and a channel number to indicate a particular channel that the wireless frame is detected; and
   transmitting a first message including the information to a Management Server to begin classification of the AP the first message includes an AP class parameter to indicate a current classification of the AP, the AP class parameter is set to a "Rogue" state upon initially detecting the AP.

7. The method of claim 6, wherein the first message transmitted to the Management Server further includes an AP type parameter to indicate either (i) a manufacturer, (ii) a make or (iii) a model of the AP.

8. The method of claim 6 further comprising:
   receiving a second message from the Management Server to classify the AP, the second message including at least the BSSID of the AP.

9. The method of claim 8 further comprising:
   transmitting a third message to the Management Server in response to the second message, the third message including the BSSID of the AP, identifiers for each AP detected within the signal coverage area, a number of wired nodes coupled to each AP, and Media Access Control (MAC) addresses for each of the wired nodes.

10. A method comprising:
    detecting an Access Point (AP) previously undetected within a signal coverage area;
    extracting information from a wireless frame transmitted from the AP;
    transmitting a first message including the information to a Management Server to begin classification of the AP;
    receiving a second message from the Management Server to classify the AP, the second message including at least the BSSID of the AP;
    transmitting a third message to the Management Server in response to the second message the third message including the BSSID of the AP, identifiers for each AP detected within the signal coverage area, a number of wired nodes coupled to each AP, and Media Access Control (MAC) addresses for each of the wired nodes; and
    classifying the MAC addresses into two groupings including a first grouping of wired MAC addresses for APs in a Valid state and a second grouping of wired MAC addresses for APs in a Rogue state.

11. The method of claim 10 further comprising:
    signaling the detected AP to be classified as an Unsecured AP if a common MAC address is found in both the first grouping and the second grouping, otherwise, classified as an Interfering AP.

12. The method of claim 11, further comprising sending a fourth message from the Management Server to all devices monitoring the newly detected AP to deauthenticate the newly detected AP.

* * * * *

UNITED STATES PATENT AND TRADEMARK OFFICE
CERTIFICATE OF CORRECTION

PATENT NO. : 6,957,067 B1  
APPLICATION NO. : 10/254125  
DATED : October 18, 2005  
INVENTOR(S) : Pradeep Iyer Page 1 of 1

It is certified that error appears in the above-identified patent and that said Letters Patent is hereby corrected as shown below:

Column 11, Claim 1, line 35, delete "plurality or" and insert --plurality of--.

Column 11, Claim 1, line 44, delete "hit in" and insert --bit in--.

Column 12, Claim 10, line 41, delete "second message the" and insert --second message, the--.

Signed and Sealed this
Twenty-fifth Day of September, 2012

David J. Kappos
*Director of the United States Patent and Trademark Office*